Sept. 7, 1948.  H. M. HUTCHINSON  2,448,804
HUNTING AND FISHING GARMENT
Filed Sept. 23, 1946  2 Sheets-Sheet 1
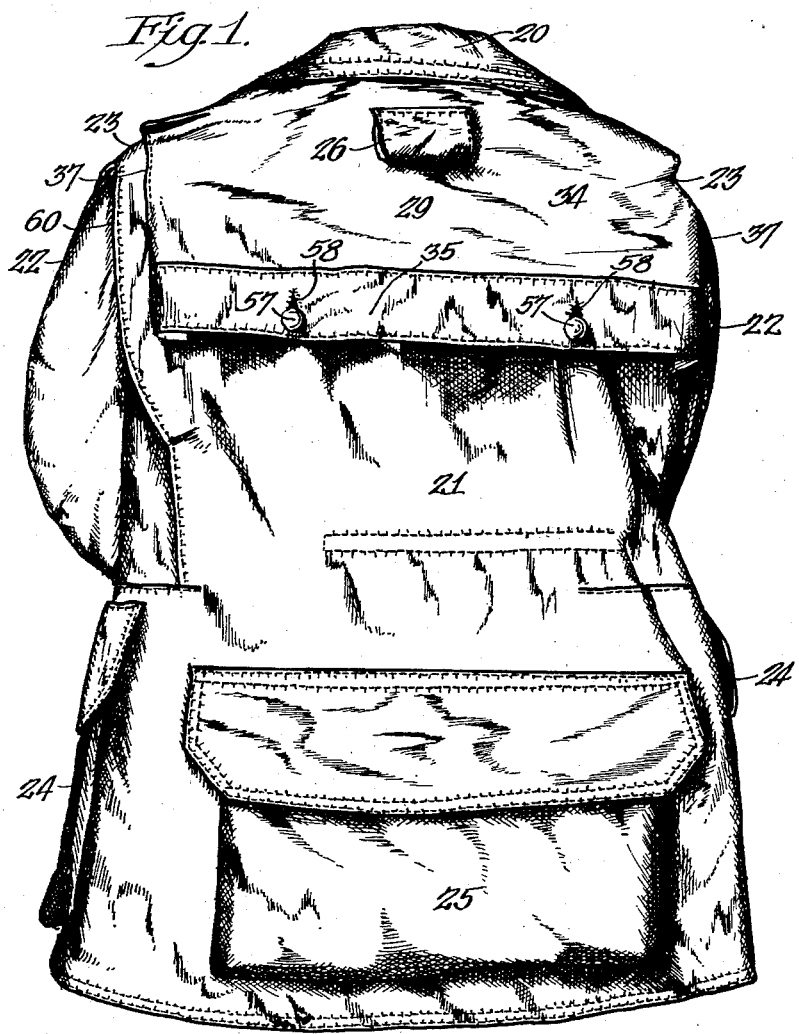
INVENTOR
Harry M. Hutchinson
BY
ATTORNEY Sept. 7, 1948. H. M. HUTCHINSON 2,448,804
HUNTING AND FISHING GARMENT
Filed Sept. 28, 1946 2 Sheets-Sheet 2
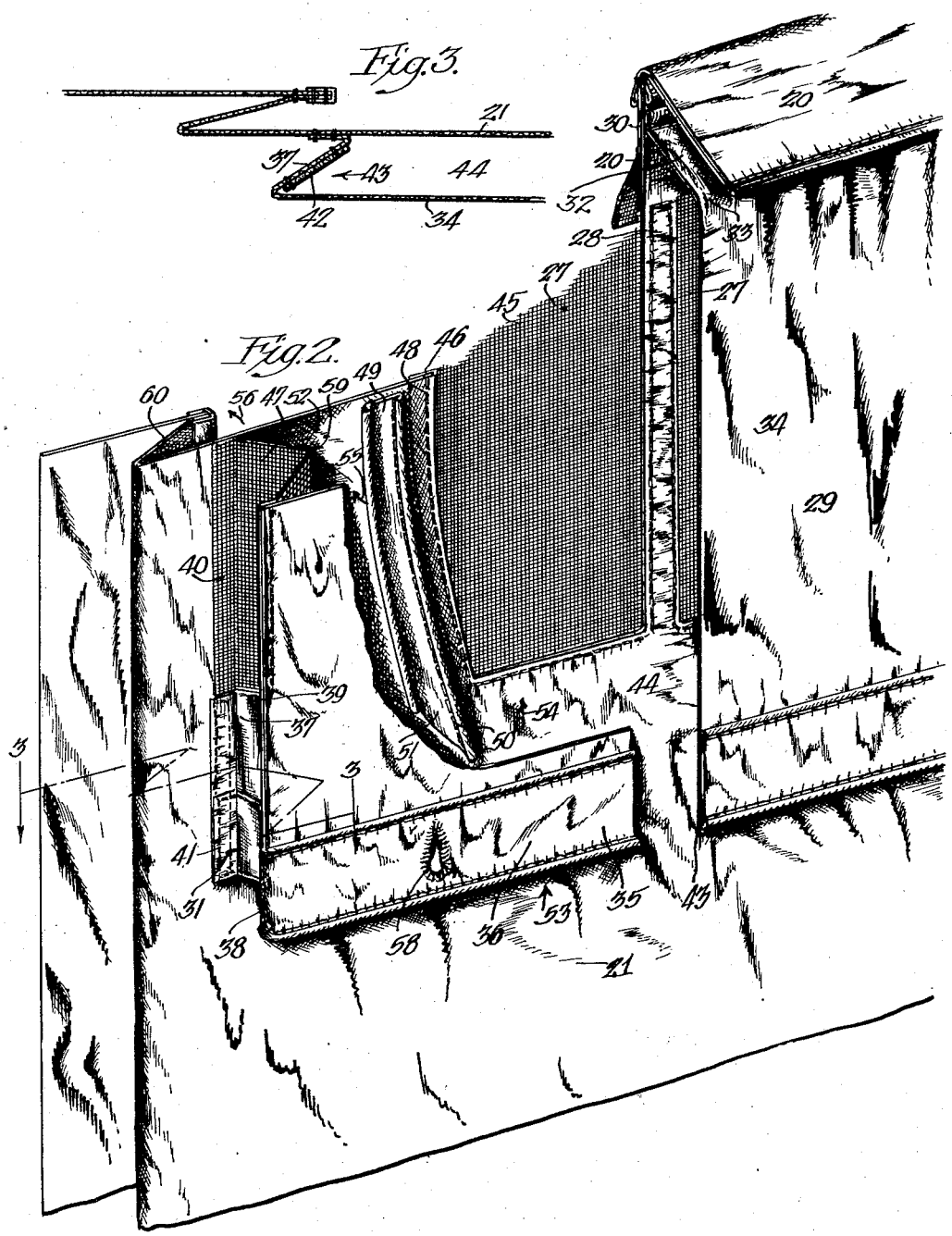
INVENTOR
Harry M. Hutchinson
BY
ATTORNEY Patented Sept. 7, 1948

2,448,804

UNITED STATES PATENT OFFICE 2,448,804

HUNTING AND FISHING GARMENT

Harry M. Hutchinson, Carlisle, Pa., assignor to C. H. Masland & Sons, Carlisle, Pa., a corporation of Pennsylvania Application September 28, 1946, Serial No. 700,114

2 Claims. (Cl. 2—94)

My invention relates to coats and the like, particularly of the type intended for hunting, fishing and sportswear.

A purpose of my invention is to prevent discomfort due to the entrance of moisture through a constantly open side port in a ventilating cape of a coat or the like.

A further purpose is to provide a gutter on a ventilating opening in the back of a coat and beneath a ventilating cape, to divert moisture entering a side port away from a ventilating opening and out a bottom port of the cape.

A further purpose is to provide a moisture diverting rib on the outer edge of a ventilating opening, desirably screened, and located between the shoulders in the back of a coat, with adequate spacing of the rib from a side port of a ventilating cape, to prevent moisture entering through the side port from flowing over the rib.

Further purposes appear in the specification and in the claims.

In the drawings I have chosen to illustrate one only of the numerous embodiments in which my invention may appear, choosing the form shown from the standpoints of convenience in illustration, satisfactory operation and clear demonstration of the principles involved.

Figure 1 is a rear elevation of a coat embodying the principles of my invention.

Figure 2 is a broken fragmentary perspective of the cape portion of the coat shown in Figure 1.

Figure 3 is a section of Figure 2 on the line 3—3.

In the drawings like numerals refer to like parts.

Numerous efforts have been made to embody ventilation openings in garments, with a view to removing body heat and moisture, and adding to the comfort of the wearer. In many developments in this direction, difficulty has been encountered due to the inability to provide adequate circulation without permitting ingress of moisture, in the case of inclement weather.

In the coat invented by Charles H. Masland, 2nd, forming the subject matter of a copending application, Serial No. 700,953, filed October 3, 1946, for Coat, the difficulties in ventilation and in preventing ingress of moisture under normal inclement weather conditions were largely overcome, but my experience has indicated that it is still possible to subject the wearer to serious annoyance and some hazard through wet clothing in connection with this improved ventilating coat construction. By the present invention this difficulty has been overcome.

In the drawings I show a hunting and fishing coat having a collar 20 suitably of roll type, a back 21, sleeves 22 (which may of course be omitted), shoulders 23, side pockets 24, and a rear pocket 25. This may be considered to be a conventional garment of the character in question.

A loop 26 is provided for the purpose of hanging up the coat.

In the back and preferably centrally located below the collar and between the shoulders I provide a ventilating opening 27 suitably subdivided by a separating rib 28 of fabric of the back of the coat. Extending from shoulder to shoulder over the back of the coat and desirably of substantially rectangular form as shown, covering the ventilating opening 27 and terminating below it, I provide a cape 29 stitched along the top to the coat at 30, suitably below the collar so that the collar will cover the stitch line, stitched to each side to the coat at 31 and normally entirely free from the coat at the bottom.

The cape has a top portion 32 extending out from the back of the coat and downwardly bent at 33 to form a back portion 34 parallel to but normally well spaced from the back 21 of the coat. The back of the cape terminates in a bottom portion 35 which is provided from side to side with a stiffening rib 36.

The sides 37 of the cape are suitably separate panels stitched to the back of the cape at 38, to the back of the coat at 31 and terminating at some such point as 39 to provide side openings or ports 40 of the width of the side panel extending from 39 to the top of the cape at each side. A stiffening rib 41 extends along the side panel in prolongation of the stiffening rib 36 at the back of the cape, and inside the side panel at each side is provided additional stiffening 42 (Figure 3). The length of the material in horizontal section extending across the cape (Figures 2 and 3) consisting of the length of the side panels plus the length of the back of the cape is considerably greater than the length across the back of the coat. This feature, combined with the stiffening in the side panels and in the bottom of the back of the cape, tends to make the cape stand out well from the back of the coat, providing in open position a bottom port 43 extending from side to side of the cape at the bottom between the cape and the back of the coat and cooperating with a chamber 44 inside the cape and extending from the top of the cape of the same horizontal cross section as the port 43 as seen in Figure 3.

Likewise in vertical cross section as seen at the center of the coat in Figure 2, the cape is bulged out with respect to the coat due to the greater vertical length of the top 32 and the back 34 of the cape as compared with the portion of the back of the coat extending down to the bottom of the cape.

In order to prevent intrusion of insects and the like into the interior of the coat, to provide uniform stress distribution across the ventilating opening 27 and to improve the hang of the coat on the wearer, insect screen or fly netting is provided at 45 across the ventilating opening and stitched thereto at 46 around the circumference. Likewise insect screen or fly netting is provided at 47 on each side port. The insect screen may desirably be of nylon (linear polyamide) or plastic, and preferably will have stiffness approximating that of the fabric so as to provide more uniform contour of the coat to the body of the wearer.

The outer edge 48 of the ventilating opening 27 is desirably well spaced inwardly toward the center of the coat with respect to the side port 40 to minimize the amount of moisture that will enter the interior of the cape in case of rain.

Immediately on the outside of the ventilating opening at each side of the coat, and suitably extending fully to the top of the ventilating opening and slightly below the bottom of the same, I provide a drainage gutter 49 on each side of the coat (only one being shown), suitably in the form of a fabric rib stitched to the back of the coat at 50. The extension below the bottom of the ventilating opening is shown at 51.

Where the gutter 49 is not provided at each side, I find that in some cases, particularly where rain is combined with a stiff wind, there is a tendency for moisture, driving in through the side port 40, to spread over the imperforate fabric 52 of the back of the coat between the side of the cape and the outer side edge 48 of the ventilating opening, and flow into the ventilating opening. By interposing the gutter 49, I find that moisture collecting in the space 52 of the back of the coat is diverted and directed downwardly, and flows at each side of the cape through the bottom port 43.

It will be evident, of course, that it is desirable to provide an adequate space 52 between each side port and each gutter 49, as the gutter is less effective when it is placed immediately inside the side port.

In operation of the device when used for the purpose of ventilation, the air is free to enter through the bottom port as shown by the arrow 53 and to flow upwardly, as indicated by the arrow 54 and over the ventilating opening, then diverting to the side as indicated by the arrow 55 and out through the side ports, as indicated by the arrow 56. In passing over the ventilating opening, moisture and heat can be taken up from the body, adding to the comfort of the user. The gutter 49 will impose very little impediment in the path of the air, since as shown in Figure 3 the chamber 44, through which the air is flowing is adequately wide.

In case of moisture entering through the side port 40, the gutter 49 will immediately divert such moisture downwardly along the outer edge of the gutter and discharge it through the bottom port 43 at each side of the cape.

In case the temperature or other conditions make it desirable to cut off ventilation, the user can close the bottom port 43 to ventilation by buttoning buttons 57 on the back of the coat in button holes 58 at the lower edge of the cape. The cape will then be pulled in against the back of the coat and the side ports will be partially collapsed by folding the screen 47 along the fold line 59. The side ports will still remain partially open, however, even if ineffective from the standpoint of ventilation, and moisture may still enter the side ports, but it will be diverted downwardly by the gutters 49 and will flow out through the restricted opening still remaining in the bottom port 43, since the bottom of course does not close into a water tight condition which would prevent water from flowing out from the interior of the cape.

To provide adequate fullness across the shoulders and prevent undue pulling on the ventilating openings, conventional shoulder pleats are illustrated at 60 at the sides of the cape.

It will be evident that the gutter of my invention functions whether the cape is open for ventilation purposes or is closed, and thus assures protection of the wearer against moisture entering the side ports, notwithstanding that the side ports are open to some extent at all times.

In view of my invention and disclosure variations and modifications to meet individual whim or particular need will doubtless become evident to others skilled in the art, to obtain all or part of the benefits of my invention without copying the structure shown, and I, therefore claim all such insofar as they fall within the reasonable spirit and scope of my claims.

Having thus described my invention what I claim as new and desire to secure by Letters Patent is:

1. A coat having a collar and a back, provided with a ventilation opening below the collar and between the shoulders, a generally rectangular cape extending across the back from shoulder to shoulder, secured at the top to the coat, covering the ventilation opening and open at the bottom, said cape having sides which stand out from the coat, are closed at the lower portion of the sides and are provided with side ports in the sides and, gutters, one secured to the back of the coat on each side of the ventilation opening inside the cape adjoining each side port and adapted to divert moisture entering the side ports away from the ventilation opening and to the open bottom.

2. A coat having a collar and a back provided with a ventilation opening below the collar and between the shoulders, a screen covering the ventilation opening, a cape secured at the top to the coat extending across from shoulder to shoulder over the ventilation opening, having side ports at the upper portion of each side, bulging away from the back of the coat and open at the bottom in one position, screens covering the side ports and ribs of fabric secured to the back of the coat in a general vertical direction on the outer edge of the ventilation opening and adapted to divert moisture entering the side ports from the ventilation opening.

HARRY M. HUTCHINSON.

REFERENCES CITED

The following references are of record in the file of this patent:

UNITED STATES PATENTS

| Number | Name | Date |
|---|---|---|
| 367,921 | Norton | Aug. 9, 1887 |